United States Patent [19]
Nochi

[11] Patent Number: 5,386,359
[45] Date of Patent: Jan. 31, 1995

[54] MULTI-OUTPUT DC-DC CONVERTER USING A RESONANCE CIRCUIT

[75] Inventor: Hideo Nochi, Fukushima, Japan

[73] Assignee: NEC Corporation, Tokyo, Japan

[21] Appl. No.: 72,315

[22] Filed: Jun. 3, 1993

[30] Foreign Application Priority Data

Jun. 3, 1992 [JP] Japan .................................. 4-142529

[51] Int. Cl.[6] .......................................... H02M 3/335
[52] U.S. Cl. .................................... 363/21; 323/282
[58] Field of Search .......................... 363/21, 16, 26; 323/267, 282, 285

[56] References Cited

U.S. PATENT DOCUMENTS

| | | | |
|---|---|---|---|
| 3,671,853 | 6/1972 | Weischedel et al. | 323/267 |
| 4,521,725 | 6/1985 | Phaneuf | 323/282 |
| 5,070,294 | 12/1991 | Nochi | 323/267 |

*Primary Examiner*—Kristine L. Peckman
*Assistant Examiner*—E. To
*Attorney, Agent, or Firm*—Ostrolenk, Faber, Gerb & Soffen

[57] ABSTRACT

A multi-output converter capable of stabilizing the output voltages Vo1, Vo2 and Vo3 of a first to a third output circuits, respectively, converted from the input voltage Vi of a DC voltage source. The output voltage Vo1 is stabilized by a frequency modulation technology using a switching device, a resonance circuit, an error detecting circuit, and a modulating circuit. The output Vo2 is stabilized by a pulse width modulation scheme using the switching device, error detecting device, and modulating circuit. Further, to stabilize the output voltage Vo3, a resonance frequency modulating circuit is applied to control the resonance frequency of a variable resonance circuit on the basis of the error voltage of an output voltage. The converter can accommodate even three or more outputs circuits with a minimum of loss and a miniature, reliable and inexpensive configuration.

7 Claims, 8 Drawing Sheets

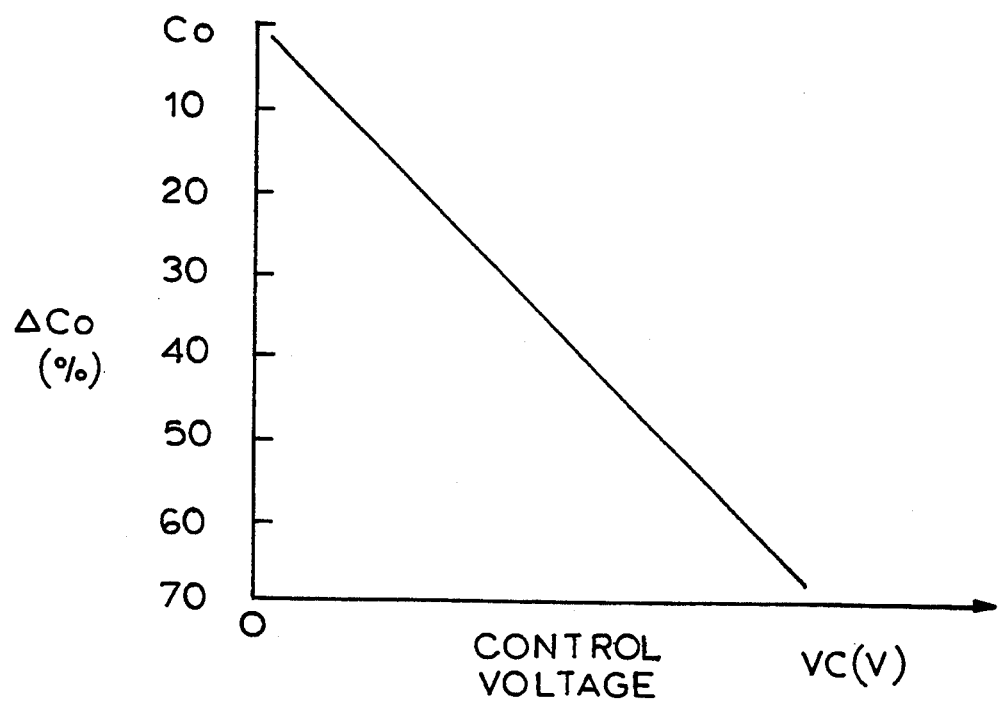
F I G. 5

VOLTAGE OF SWITCHING DIVICE 118

INPUT CURRENT OF RESONANCE CCT 120
INPUT CURRENT OF 1st INPUT CCT 200

BOUNCE CURRENT

CURRENT OF DIODE 2

INPUT CURRENT OF 2nd, 3rd OUTPUT CCTs 300,400

CURRENT OF DIODE 23

CONTROL VOLTAGE

MULTI-OUTPUT DC-DC CONVERTER USING A RESONANCE CIRCUIT

BACKGROUND OF THE INVENTION

The present invention relates to a multi-output converter having a plurality of output circuits and, more particularly, to a multi-output converter capable of stabilizing the output voltages of output circuits by changing the switching frequency of a switching device, a conduction duty cycle, and a resonance frequency of particular one of the output circuit.

To better understand the present invention, a brief reference will be made to a conventional multi-output converter, shown in FIG. 1. As shown, a DC voltage source 6 generates a DC voltage Vi while a capacitor 7 bypasses an AC component appearing on the output of the source 6. A field effect transistor (FET) 63 produces an AC component from the DC voltage Vi by a switching operation. This AC component is fed to a first to a third output circuit 200b, 300c and 400c through a transformer 64. The output circuits 200b to 400c may each be replaced with a voltage conversion circuit for converting the DC voltage Vi to another DC voltage, e.g., a forward converter or a flyback converter. Also, the FET 63 may be replaced with an IGBT (Insulating Gate Bipolar Transistor).

In the first output circuit 200c, diodes 9 and 10 belonging to a group of one-way elements rectify the AC component from the transformer 64. An inductor 11, a capacitor 12 and a filter (FIL) 13 smooth the rectified output of the diodes 9 and 10 in cooperation. As a result, an output voltage Vo1 appears between terminals 201 and 202. The voltage on the output of the inductor 11 (substantially equal to the output voltage Vo1) is divided by resistors 35 and 36 included in an error voltage detecting circuit 600a. The divided voltage is applied to one input of an error amplifier 40 which receives a reference voltage Vr1 at the other input. The error amplifier 40 amplifies a difference between the divided voltage and the reference voltage Vr1 and feeds the output thereof to a pulse width modulator 65. The pulse width modulator 65 controls the duration of conduction of the FET 63 by a pulse width corresponding to the output of the error amplifier 40. Specifically, when the output voltage Vo1 of the first output circuit 100b is high, the pulse width modulator 65 delivers to the gate electrode of the FET 63 a control voltage having a pulse width which reduces the duration of conduction of the FET 63. By such control over the FET 63, the output voltage Vo1 is stabilized.

The second output circuit 300c has diodes 16 and 17 which rectify the AC component from the transformer 64. An inductor 18, a capacitor 19 and a filter (FIL) 20 cooperate to smooth the rectified output of the diodes 16 and 17. An output voltage Vo2 appears between terminals 301 and 302. It is to be noted that the voltage on the output of the inductor 18 is an unstable voltage and is stabilized by a triterminal regulator 62 inserted between the inductor 18 and the filter 20 to a predetermined voltage (substantially equal to the output voltage Vo2).

The third output circuit 400c has diodes 26 and 27 for rectifying the AC component from the transformer 64. An inductor 28, a capacitor 29 and a filter (FIL) 30 smooth the rectified output. As a result, an output voltage Vo3 appears between terminals 401 and 402. The voltage on the output of the inductor 28 is also unstable and is stabilized by a triterminal regulator 61 interposed between the inductor 28 and the filter 30 to a predetermined voltage (substantially equal to the output voltage Vo3).

FIG. 2 shows another prior art multi-output converter essentially similar to the circuitry of FIG. 1 except that the second and third output circuits 300c and 400c are replaced with slightly modified second and third output circuits 300d and 400d, respectively.

Specifically, the second output circuit 300d differs from the corresponding circuit 300c in that the triterminal regulator 62 is removed, and in that a control circuit 70b, a diode 80 and a saturable reactor 79 are provided. The control circuit 70b controls, in response to the voltage on the output of the inductor 18 and via the diode 80, the reset current of the saturable reactor 79 connected between the secondary winding of the transformer 64 and the input of the diode 16 so as to change the voltage blocking period of the reactor 79 which corresponds to the reset current period. As a result, the control circuit 70b stabilizes the output voltage Vo2. The control circuit 70b includes resistors 75 and 76 for dividing the voltage on the output of the inductor 18, an error amplifier 73 for generating an error output from the divided voltage and a reference voltage Vr from a reference voltage source 74a, and a transistor 71 and a resistor 72 for amplifying the error output and applying the amplified error output to the diode 80.

The third output circuit 400d is similar to the corresponding circuit 400c except that the triterminal regulator 61 is removed, and in that a control circuit 70a, a diode 78 and a saturable reactor 77 are provided. The control circuit 70a controls, in response to the voltage on the output of the inductor 28 and via the diode 78, the reset current of the saturable reactor 77 connected between the secondary winding of the transformer 64 and the input of the diode 2 so as to change the voltage blocking period of the reactor 77 which corresponds to the reset current period. By such control, the control circuit 70a stabilizes the output voltage Vo3. The control circuit 70a includes resistors 75 and 76 for dividing the voltage on the output of the inductor 28, an error amplifier 73 for producing an error output from the divided voltage and a reference voltage Vr3 from a reference voltage source 74b, and a transistor 71 and a resistor 72 for amplifying the error output and feeding the resulting output to the diode 78.

Referring to FIG. 3, still another prior art multi-output converter will be described which is disclosed in U.S. Pat. No. 5,070,294. As shown, a DC voltage Vi whose AC component has been bypassed appears on opposite ends of a DC voltage source 6 and a capacitor 7. A switching device 110a includes an FET 1 for turning on and turning off the conduction of the DC voltage Vi, and a diode 3 for causing a reverse current to flow which will be blocked by the FET 1. By a switching operation, the switching device 110 produces an AC component from the DC voltage Vi. A resonance circuit 120 includes a series connection of an inductor 4 and a capacitor 5 and provides the AC component from the switching device 110a with a sinusoidal waveform at the junction of the drain of the FET 1 and an inductor 4. The switching device 110a and resonance circuit 120 constitute a resonance switching circuit 100a in combination. Opposite ends of the capacitor 5 are connected to the primary winding of a transformer 8 included in a first output circuit 200. Opposite ends of the series connection of the inductor 4 and capacitor 5 are connected to the primary winding of a transformer 15 included in a second output circuit 300e. The resonance switching circuit 100a and first output circuit 200 arranged in a pair and the second output circuit 300e may each be replaced with a voltage conversion circuit for converting the DC voltage Vi to another DC voltage, e.g., a forward converter or a flyback converter. Also, an IGBT or similar switching element may be substituted for the FET 1.

The first output circuit 200 has diodes 9 and 10 for rectifying the AC component from the secondary winding of the transformer 8. An inductor 11, a capacitor 12 and a filter (FIL) 13 cooperate to smooth the rectified output. As a result, an output voltage Vo1 appears between terminals 201 and 202. Resistors 35 and 36 are included in an error voltage detecting circuit 600 to divide the voltage on the output of the inductor 11. The divided voltage is applied to one input of an error amplifier 40 which receives a reference voltage Vr1 at the other input. The error amplifiers 40 amplifies the difference between the divided voltage and the reference voltage Vr1 and delivers the output thereof to a modulating circuit 500. The modulating circuit 500 turns on and turns off the conduction of the FET 1 by a modulation (switching) frequency matching the output of the error amplifier 40. Assume that the modulation frequency is lower than the fixed resonance frequency of the resonance switching circuit 100a. When the output voltage Vo1 is lower than desired one, the modulating circuit 500 increases the modulation frequency and, therefore, the conduction duty of the FET 1, thereby raising the output voltage Vo1. Conversely, when the output voltage Vo1 is high, the circuit 500 reduces the modulation frequency and, therefore, the conduction duty of the FET 1 so as to lower the output voltage Vo1.

In the conventional converters shown in FIGS. 1 and 2, the resistors 35 and 36, reference voltage source 39 and error amplifier 40 are used to stabilize the output voltage Vo1 of the first output circuit 200b by controlling the duration of conduction of the FET 63. In the conventional circuitry of FIG. 3, they control the modulation frequency of the FET 1 so as to stabilize the output voltage Vo1.

The second output circuit 300e rectifies the AC component from the transformer 15 by diodes 16 and 17, smooths the rectified output by an inductor 18, a capacitor 19 and a filter (FIL) 20, thereby producing an output voltage Vo2 between terminals 301 and 302. Resistors 37 and 38 are included in an error voltage detecting circuit 600 to divide the voltage on the output of the inductor 18. The divided voltage is applied to one input of an error amplifier 41 whose other input is connected to a reference voltage source Vr1. The error amplifier 41 amplifiers the difference between the divided voltage and the reference voltage Vr1 and feed the output thereof to the modulating circuit 500. The modulating circuit 500 controls the duration of conduction (ON) of the FET 1 by a pulse width matching the output of the error amplifier 41. Specifically, when the output voltage Vo2 of the second output circuit 300e is higher than predetermined one, the modulating circuit 500 applies to the gate electrode of the FET 1 a control voltage having a pulse width which reduces the duration of conduction of the FET 1, thereby stabilizing the output voltage Vo2.

The first-described conventional converter stabilizes the output voltage of each of the second and third output circuits by use of a triterminal regulator. This brings about a drawback that a great loss particular to the triterminal regulator not only lowers the power transforming efficiency but also results in the need for a radiator, heat sink or similar cooling part usually associated with a converter. The cooling part undesirably increases the overall size of the converter. Moreover, the accuracy of the output voltage and stability of the converter is determined solely by the triterminal regulator and cannot be freely set.

The second-described conventional converter needs further extra parts, e.g., transistors and resistors for driving the saturable reactor. Moreover, since these parts, including the saturable reactor, bring about losses and, therefore, degrade, the power transforming efficiency. In addition, as the switching frequency of the converter increases, the losses increase the loss of the saturable reactor. This prevents the switching frequency from being increases and, therefore, prevents the converter from being reduced in size. Further, since the saturable reactor has influence on the primary side of the transformer, it is apt to cause the converter to oscillate.

The third-described conventional converter is capable of stabilizing the output voltages of two output circuits by subjecting a single switching device to frequency modulation and pulse modulation. However, the converter cannot stabilize the output voltages of a third and successive converters which may be additionally incorporated. Should the stabilizing circuitry using a triterminal regulator and a saturable reactor be applied to the third and successive output circuits, the problems discussed in relation to the first- and second-described converters would also arise.

SUMMARY OF THE INVENTION

It is therefore an object of the present invention to provide a multi-output converter which involves a minimum of loss and, therefore, has a high power transforming efficiency and can stabilize the output voltages of three or more output circuits.

It is another object of the present invention to provide a multi-output converter implemented with a small number of parts and, therefore, feasible for a miniature, reliable and inexpensive configuration.

It is another object of the present invention to provide a multi-output converter capable of producing outputs with a minimum of switching noise.

In accordance with the present invention, a multi-output converter comprises a switching circuit serially connected to a DC voltage source and having a conduction duration modulated by frequency modulation and pulse width modulation, a fixed resonance circuit connected to opposite ends of the series connection, of the DC voltage source and switching circuit for transforming an input current flowing for the conduction duration of the switching circuit into a first current having a sinusoidal waveform, a first output circuit for outputting a first output voltage by receiving only a current of positive direction contained in the first current, a frequency modulating circuit responsive to the first output voltage for modulating the conduction duration of the switching circuit on a frequency basis to thereby stabilize the first output voltage, a second output circuit connected to opposite ends of the series connection for producing a second output by receiving only the conduction duration of the switching circuit, a pulse width modulating circuit responsive to the second output voltage for modulating the conduction duration of the switching circuit on a pulse width basis to thereby stabilize the second output voltage, a variable resonance circuit connected to the opposite ends of the series connection for transforming an input current flowing for the conduction duration of the switching circuit into a second current having a sinusoidal waveform, a duration of a current of positive direction of the second current being controlled by a control voltage, a third output circuit for producing a third output voltage by receiving the current of positive direction of the variable resonance circuit and a resonance frequency modulating circuit for changing the resonance frequency of the variable resonance circuit to change the duration of the current of positive direction in response to the third output voltage, thereby stabilizing the third output voltage.

BRIEF DESCRIPTION OF THE DRAWINGS

The above and other objects, features and advantages of the present invention will become more apparent from the following detailed description taken with the accompanying drawings in which:

FIG. 5 is a graph indicative of the characteristic of a variable capacitor included in the embodiment;

DESCRIPTION OF THE PREFERRED EMBODIMENTS

Figure 3:
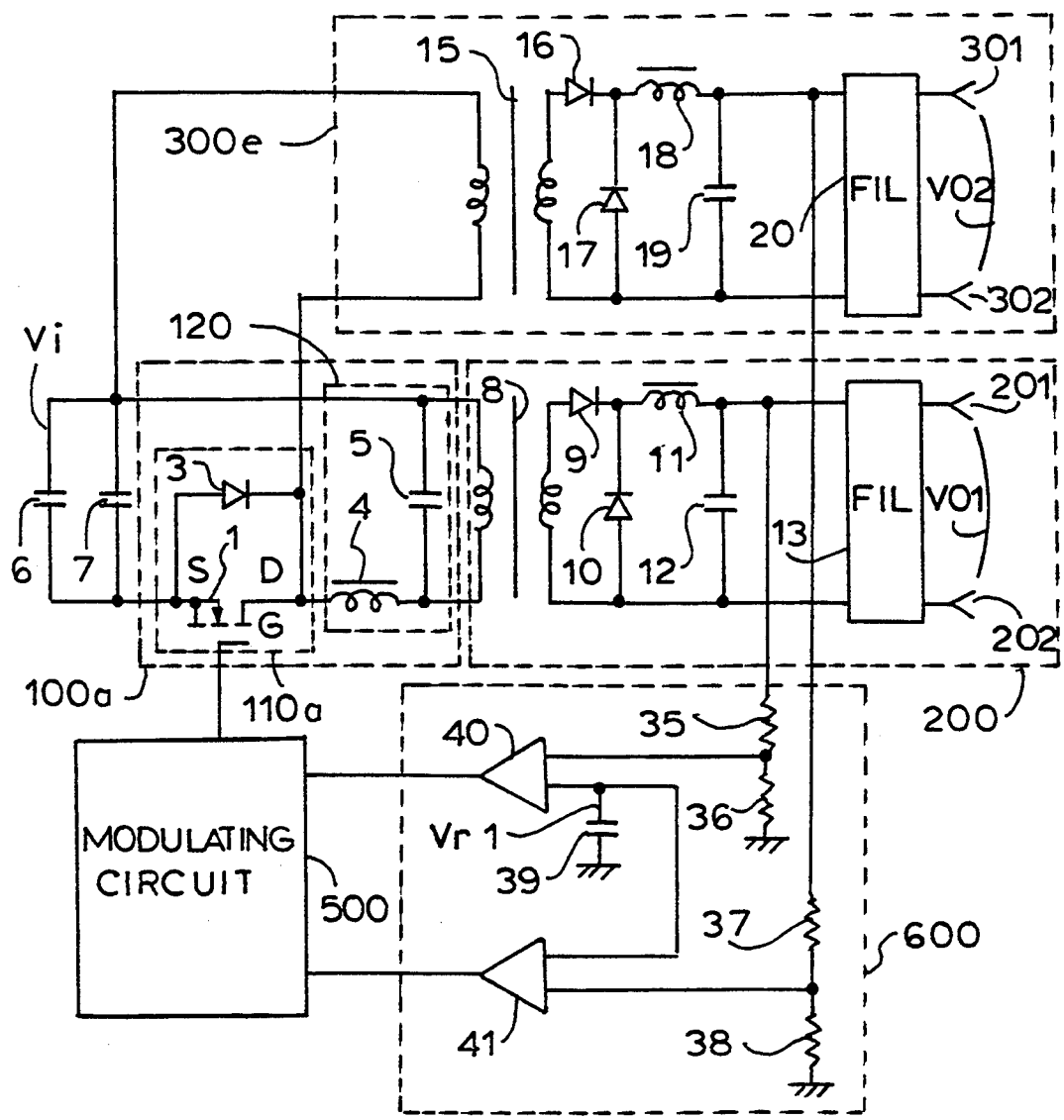
Figure 4:
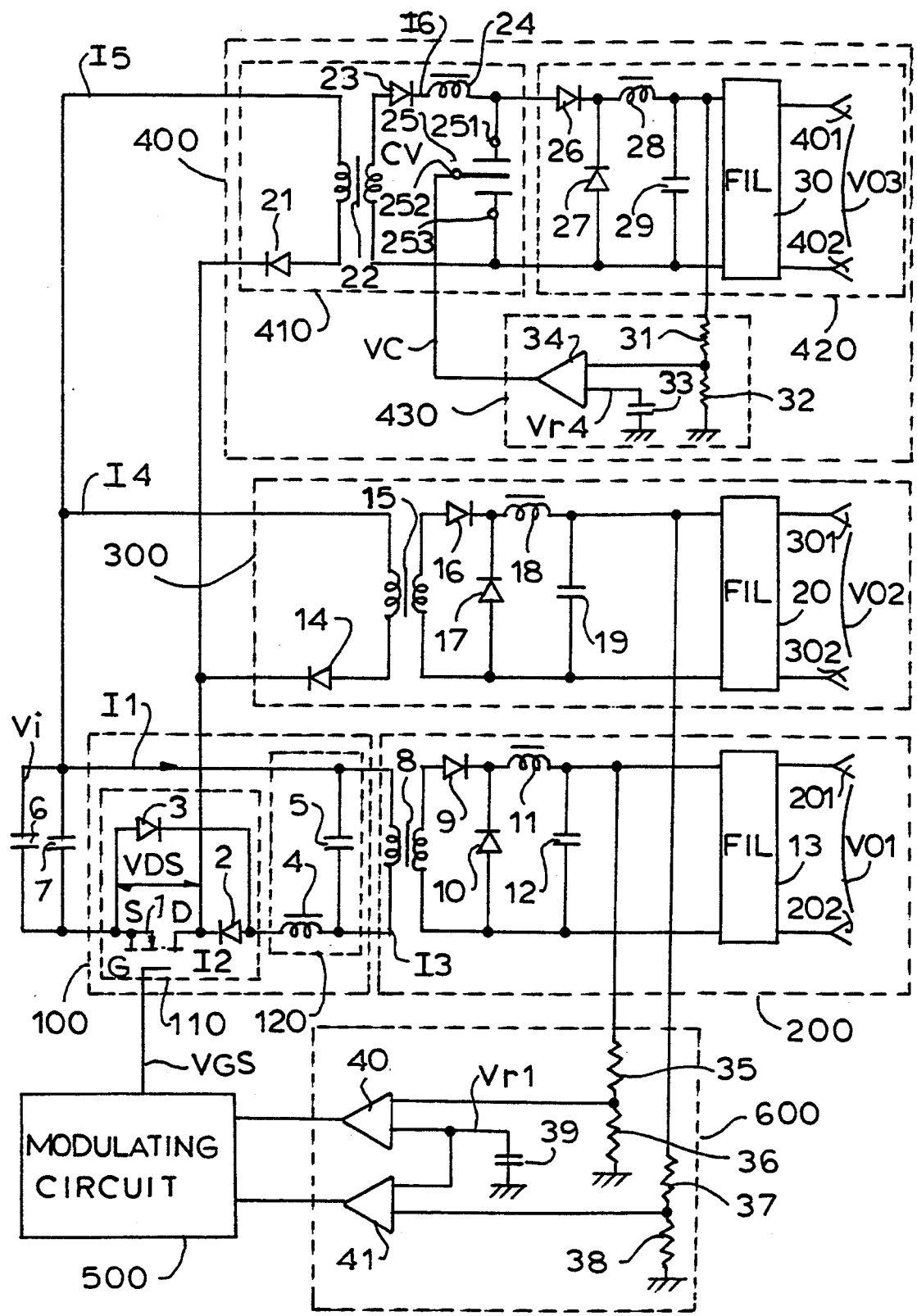
FIG. 4 is a circuit diagram representative of a multi-output converter embodying the present invention.
Figure 6A:
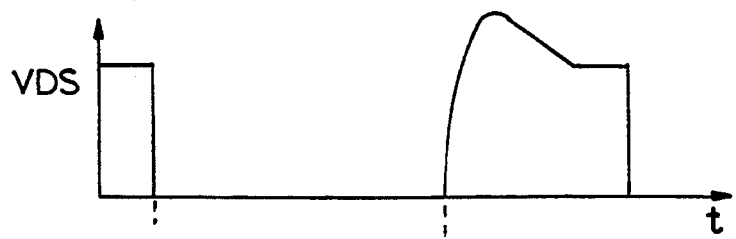
FIGS. 6(a)-(f) show waveforms appearing in various sections of the embodiment.
Figure 6B:
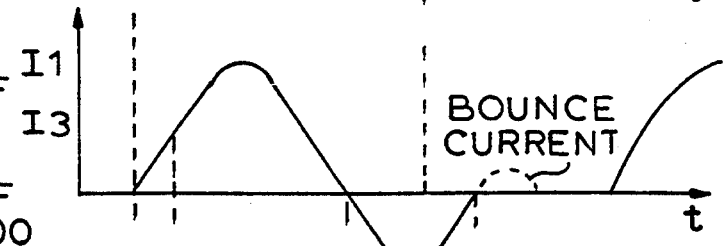
Figure 6C:
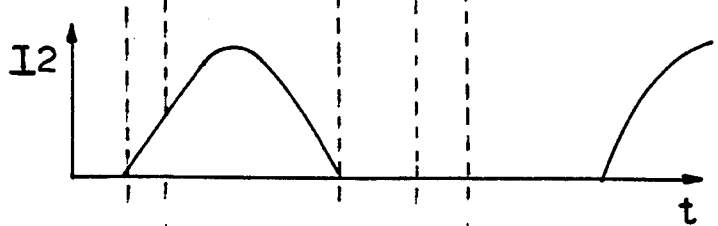
Figure 6D:
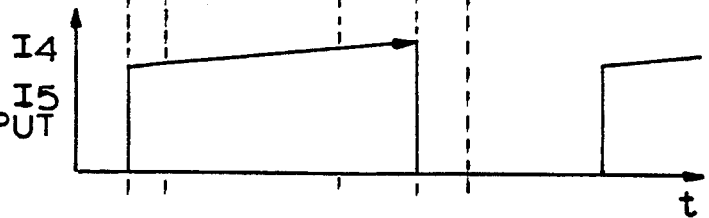
Figure 6E:
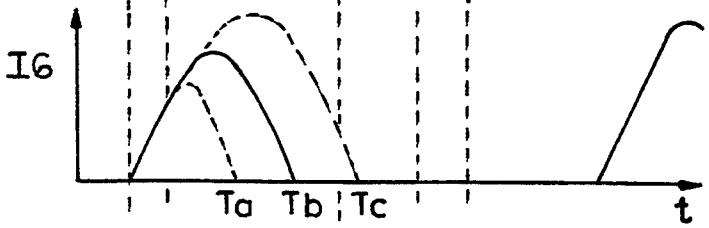
Figure 6F:
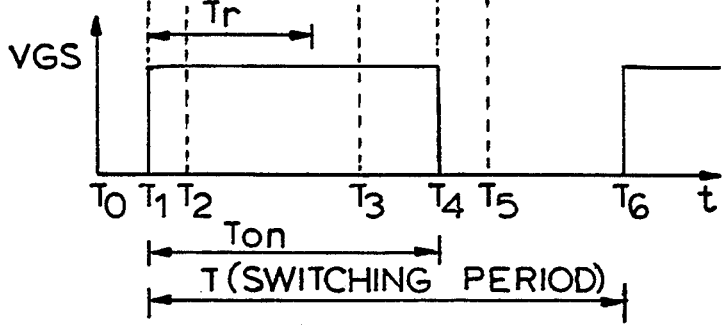

Referring to FIG. 4 showing a multi-output converter of the present invention, the converter has a DC voltage source 6, a capacitor 7, a first output circuit 200, a modulating circuit 500, and an error voltage detecting circuit 600 which are identical with those of the conventional converter shown in FIG. 3. The converter also has a resonance switching circuit 100 and a second output circuit 300 which are respectively slightly modified versions of the circuits 100a and 300e shown in FIG. 3. Further, the converter has a third output circuit 400 for producing a stabilized output voltage Vo3 from a voltage which an FET 1 generates by turning on and turning off the voltage Vi of a DC voltage source 6.

The resonance switching circuit 100 has a switching device 110 which is the combination of the switching device 110a shown in FIG. 3, and a diode 2. The diode 2 has a cathode connected to the drain of the FET 1 and an anode connected to a diode 3 and the input terminal of the inductor 4.

The second input circuit 300 is supplied with input power containing a DC component and an AC component from the positive terminal of the DC voltage source 6 and the drain of the FET 1. This circuit 300 has, in addition to the second output circuit 300e of FIG. 3, a diode 14 for preventing the conduction of a reverse current at the input of the primary winding of a transformer 15.

The third output circuit 400 which is the characteristic feature of the embodiment is supplied with input power from the positive terminal of the DC voltage source 6 and the drain of the FET 1, as the same as the second output circuit 300. A variable resonance circuit 410 has a resonance frequency Fr thereof controlled by a control voltage Vc fed from a resonance frequency modulating circuit 430. The resonance frequency Fr in turn controls the conduction duty cycle of conduction duty for short. The output of the variable resonance circuit 410 and including the AC component whose conduction duty has been controlled is delivered to an output circuit 420. In response, the output circuit 420 produces a stabilized DC voltage Vo3. The resonance frequency modulating circuit 430 detects an error voltage associated with the output voltage Vo3 and then delivers a matching control voltage Vc to the variable resonance circuit 410. As a result, a control loop for stabilizing the output voltage of the third output circuit 400 is completed.

More specifically, in the third output circuit 400, the variable resonance circuit 410 receives the abovestated input power at the primary winding of a transformer 22 via a diode 21 which blocks a reverse current. A series connection of a diode 23, an inductor 24 and a variable capacitance 25 is connected to opposite ends of the secondary winding of the transformer. The inductor 24 and variable capacitor 25 constitute a variable resonance constant circuit. Specifically, as the control voltage Vc applied to the control terminal 252 increases, the electric capacitance C0 between the terminals 251 and 253 of the capacitor 25 changes in a direction in which it decreases ΔC0 (see FIG. 5). Hence, the resonance frequency Fr of the resonance circuit 120 changes with a change in the control voltage Vc from the resonance frequency modulating circuit 430. The variable resonance constant circuit provides the current to flow through the diode 23 with a sinusoidal waveform.

Figure 1:
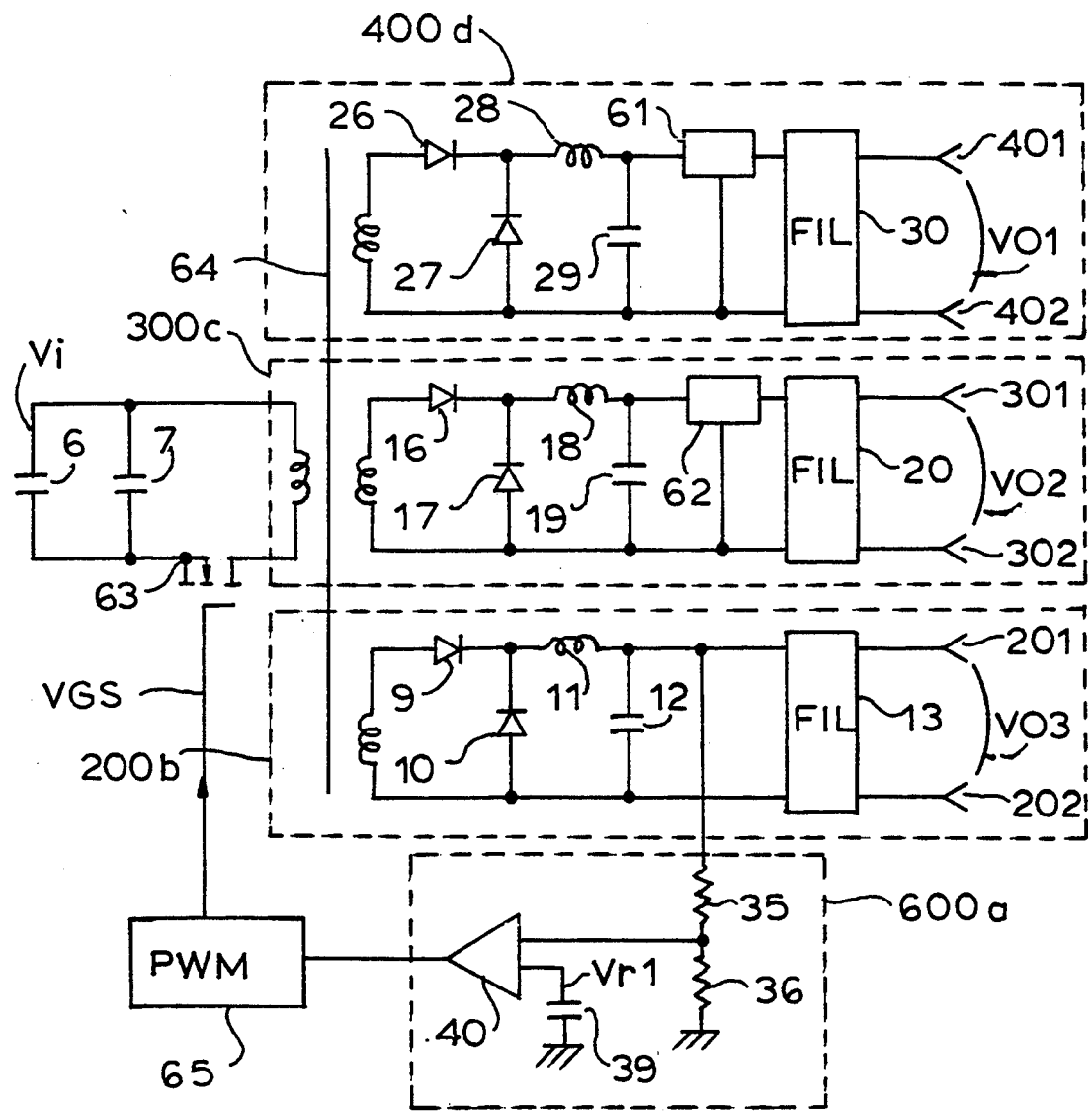
FIGS. 1 to 3 are circuit diagrams each showing a specific conventional multi-output converter.
Figure 2:
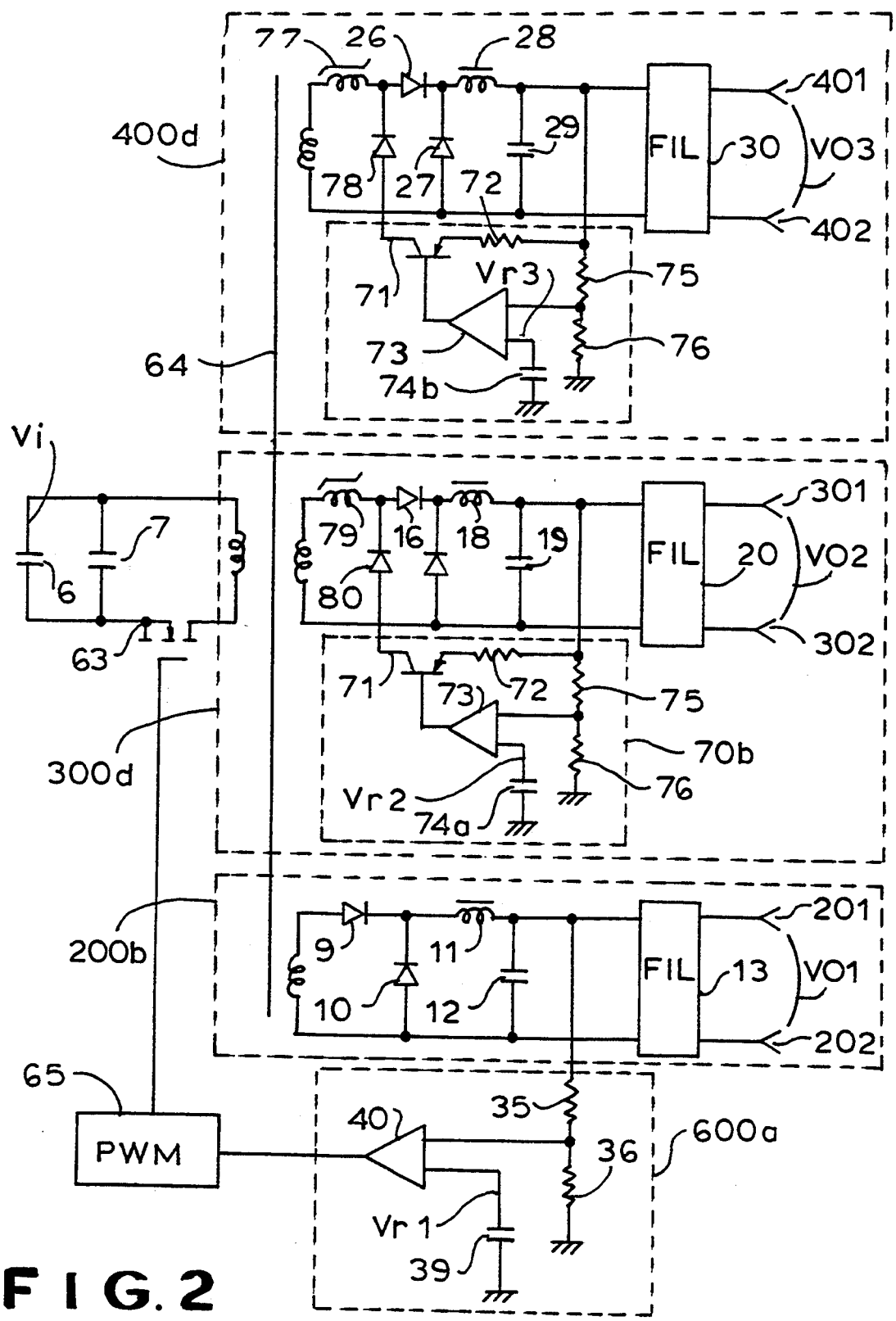

The output circuit 420 is identical with the third output circuit 400c of the conventional circuitry of FIG. 1 except that the transformer 64 is omitted, and it will not be described specifically to avoid redundancy.

In the resonance frequency modulating circuit 430, resistors 31 and 32 divide the voltage on the output terminal of an inductor 28 (corresponding to the output voltage Vo3). The divided voltage is applied to one input terminal of an error amplifier 34 which receives a reference voltage Vr4 from a reference voltage source 33 at the other input. The error amplifier 34 amplifies the difference between the divided voltage and the reference voltage Vr1 and feeds the result of amplification, i.e., a control voltage Vc to the control terminal 252 of the variable capacitor 25.

A reference will also be made to FIGS. 5 and 6 for describing the operation of the embodiment in detail. To begin with, how the output voltage Vo1 of the first output circuit is stabilized by a frequency modulation technique will be described.

From a time T0 to a time T1, the switch device 110 is held in an OFF state. During this period of time, the DC voltage Vi of the reference voltage source 6 is applied to opposite ends of the switching device 110, i.e., opposite ends of the FET 1 as a drain-source voltag $V_{DS}$. For the simplicity of description, assume that the FET 1 and diode 2 of the switching device 110 are ideal elements which prevent an ON voltage and a forward voltage drop from occurring. As the switching device 110 is turned on at the time T1, the input current I1 of the resonance circuit 120 (as well as the input current I3 of the first output circuit 200) and the current I2 to flow through the diode 2 linearly increase up to a time T2 due to the operation of the inductor 4. From the time T2, the current I1 (and I3) and the current I2 become sinusoidal due to the operation of the resonance circuit 120. From the time T1 to a time T3, the currents I1 and I2 flow in the forward direction of the switching device 110 (from the drain to the source of the FET 1). From the time T3 to a time T5, the currents I1 and I2 tend to flow in the reverse direction since energy stored in an inductor 4 is discharged. Since this reverse currents I1 and I2 are blocked by the diode 2 (the current I2 decreases to zero), they flow in the reverse direction via the diode 3.

The switching period T of the switching device 110 is controlled by a control voltage $V_{GS}$ which is applied from the modulating circuit 500 and having a variable switching frequency. The interval between the times T1 and T3 is substantially determined by the resonance constant of the resonance circuit 120 which is in turn mainly determined by the inductor 4 and capacitor 5. Hence, as the period T changes, the conduction pulse width of the switching device 110 relative to the period T, i.e., a duty D1 becomes equal to $(T3-T1)/T$. Specifically, when the output voltage Vo1 of the first output circuit 200 decreases, the switching frequency is increased to reduce the period T. As a result, the duty D1 is increased to raise the output voltage Vo1. Conversely, when the output voltage Vo1 increases, the switching frequency is reduced to lower the output voltage Vo2. This is successful in stabilizing the voltage Vo2.

A procedure for stabilizing the output voltage Vo2 of the second output circuit 300 by a pulse width modulation scheme will be described.

The switching device 110 can turn off anytime during the interval between the times T3 and T5 in which the current I1 flows in the reverse direction. By using this interval, the embodiment controls the duration of conduction Ton (conduction pulse width) of the switching device 100. The switching element 100 has a conduction duty $D2=Ton/T$. The period of time Ton begins at the time T1, and the turn-off occurs between the times T3 and T5. It follows that the input current I4 of the second output circuit 300 also flows during the period of time of conduction Ton. The switching device 110 is ON/OFF controlled by the control voltage $V_{GS}$ such that it turns off at a time close to T3 on the rise of the output voltage Vo2 of the output circuit 300 or turns off at a time close to T5 on the fall of the output voltage Vo2.

How to stabilize the output voltage Vo3 of the third output circuit 400 by a resonance frequency modulation scheme is as follows.

An input current I5 identical with the input current I4 of the second output circuit 300 is applied to the variable resonance circuit 410 of the third output circuit 400. In the variable resonance circuit 410, the current I5 flows through the diode 21, transformer 22 and diode 25 and then reaches the resonance circuit whose resonance constant is mainly determined by the inductor 24 and variable capacitor 25. As a result, the current I5 turns out a diode current I6 having a sinusoidal waveform at the cathode of the diode 23. The duration of conduction Tr of the current I6 can be changed within the range of the period of time Ton by changing the capacitance C0 of the variable capacitor 25 and, therefore, the resonance frequency Fr of the resonance circuit by the control voltage Vc. Specifically, when the capacitance of the capacitor 25 decreases, the resonance frequency Fr increases with the result that the duration of conduction Tr decreases to a duration of $T1-Ta$ to lower the output voltage Vo3. Conversely, on increasing of the capacitance C0 of the capacitor 25, the resonance frequency Fr decreases to increase the duration Tr to $T1-Tc$, whereby the output voltage Vo3 is raised. The duration of conduction of the diodes 23 relative to the switching period T, i.e., a duty D3 is Tr/T. In this way, as the output voltage Vo3 of the third output circuit 400 decreases, the control voltage Vc is lowered to increase the duration of conduction. Tr of the diode 23; as it increases, the control voltage Vc is raised to reduce the duration Tr.

The diodes 14, 21 and 23 shown in FIG. 4 are one-way elements for blocking a reverse current, i.e., for turning off the path between the drain and the source of the FET 1 as soon as the control voltage $V_{GS}$ for driving the FET 1 is turned off. Hence, the diodes 14, 21 and 23 each has to be implemented by an element having a short reverse recovery time Trr. The diode 3 serves to cause a reverse current to flow through the switching device 110, but it also has to be implemented by an element having a short reverse recovery time Trr so as to free the current I1 to flow through the inductor 4 from bounce currents.

As stated above, in the illustrative embodiment, the output voltage Vo1 of the first output circuit 200 is stabilized by controlling the switching frequency of the switching device 110. In the second output circuit 300, the output voltage Vo2 is stabilized by controlling the duty cycle D2 of switching. Further, in the third output circuit 300, the output Vo3 is stabilized by controlling the resonance frequency of the variable resonance circuit 410. Since the stabilization of the output voltage using the resonance frequency control is practicable with no regard to the number of output circuits, a converter having three or more outputs is achievable without resorting to the conventional triterminal regulator or a saturable reactor. In addition, since the sinusoidal current I1 flows through the switching element 110, zero current switching can be effected to reduce switching noise ascribable to the FET 1.

Of course, the above-described schemes for stabilizing the voltages Vo1, Vo2 and Vo3 are practicable even when the voltage Vi of the DC voltage source 6 changes or when the output current values of the output circuits 200, 300 and 400 change.

Figure 7:
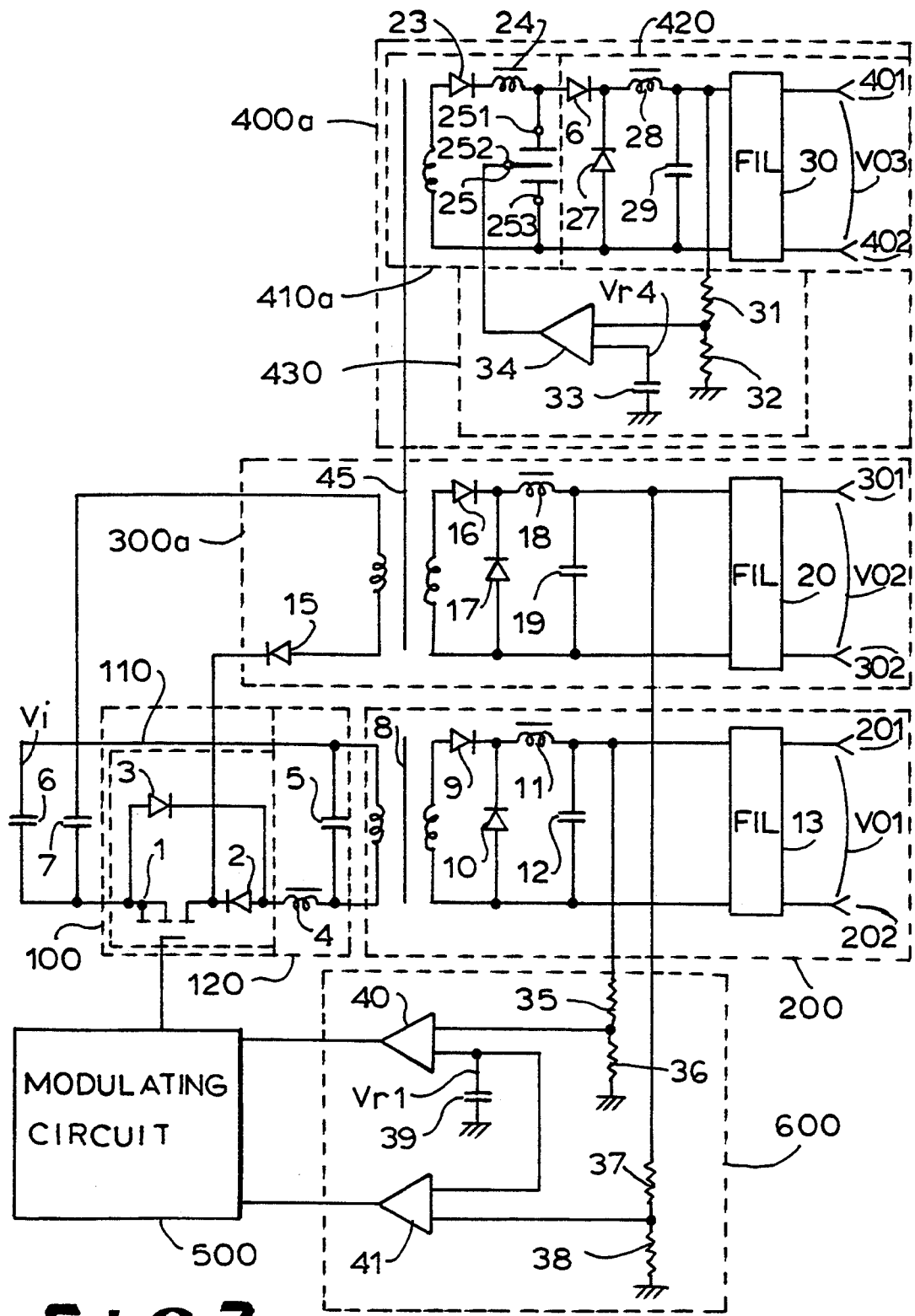
FIGS. 7 and 8 are circuit diagrams each showing an alternative embodiment of the present invention.

Referring to FIG. 7, an alternative embodiment of the present invention will be described. This embodiment is essentially similar to the embodiment of FIG. 4 except that a second output circuit 300a and a third output circuit 400a (precisely a variable resonance circuit 410a) are provided which are slightly modified versions of the second and third output circuits 300 and 400, respectively.

As shown, the second output circuit 300a has a transformer 45 having a second secondary winding in place of the transformer 15 of the second output circuit 300. A first secondary winding is connected to the diodes 16 and 17.

The third output circuit 400a has an input terminal implemented by the second secondary winding of the transformer 45. The second secondary winding is connected to between the anode of the diode 23 of a variable resonance circuit 410a and the terminal 253 of the variable capacitor 25. Therefore, in the variable resonance circuit 410a, the diode 21 connected to the primary winding of the variable resonance circuit 410 is also omitted.

In this embodiment, the input circuits associated with the second and third output circuits (diode 14 and transformer 15, and diode 21 and transformer 22) are implemented by a single diode 14 and a single transformer 45. Specifically, since the secondary windings of the transformers 15 and 22, FIG. 4, have the same duty D2, the two input circuits can be replaced with a single input circuit.

Figure 8:
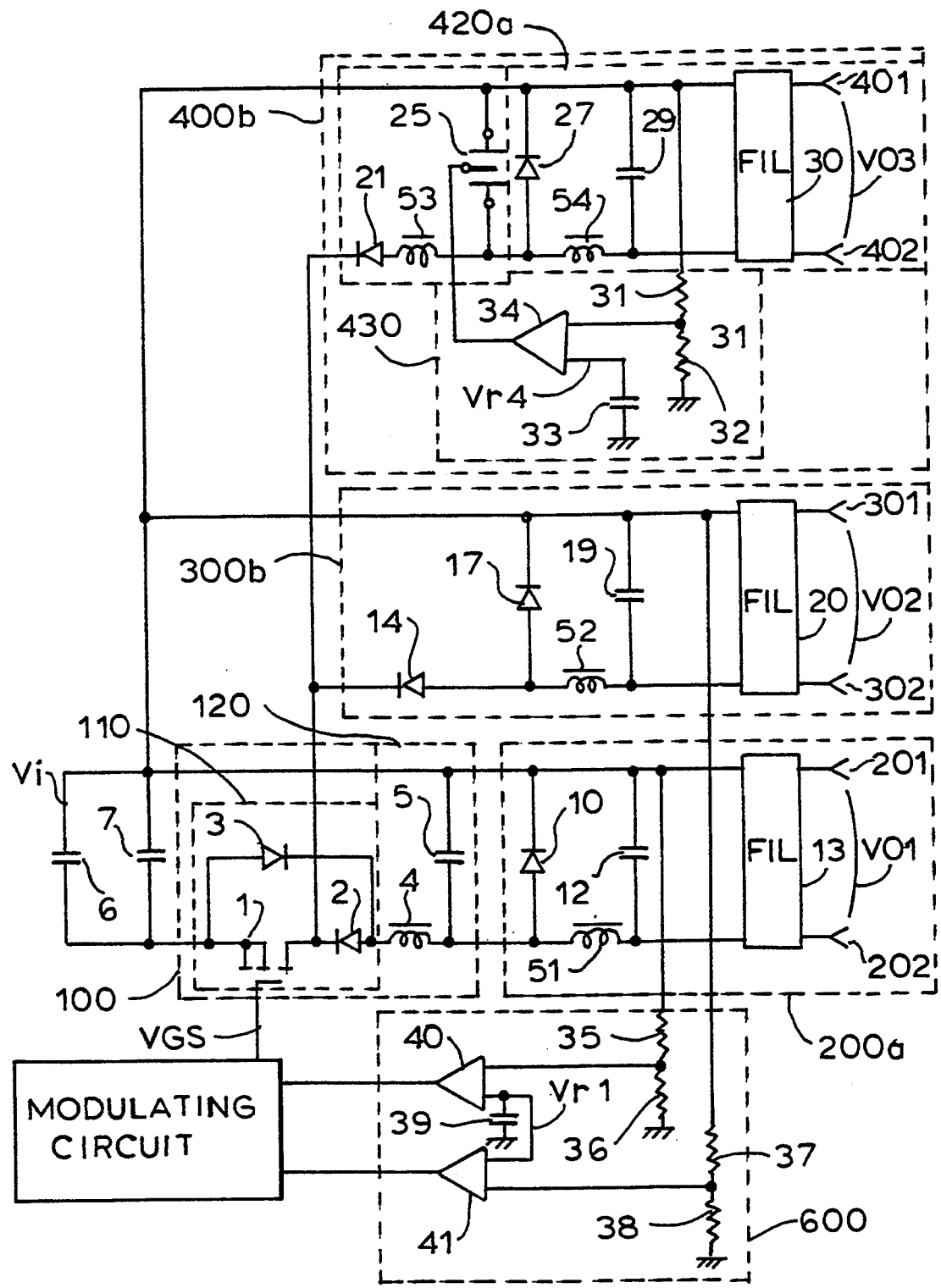

A reference will be made to FIG. 8 for describing another alternative embodiment of the present invention. This embodiment is implemented as a voltage drop type converter and, therefore, characterized in that the boosting transformers and associated rectifying diodes included in the embodiments of FIGS. 4 and 7 are omitted.

Specifically, a first output circuit 200a differs from the first output circuit 200 of FIG. 4 in that the transformer 8 and diode 9 are absent, and in that the voltage between opposite ends of the capacitor 5 of the resonance switching circuit 100 is directly applied to opposite ends of the diode 10. While the circuit 200 connects the inductor 11 to the cathode of the diode 10 and the positive terminal of the capacitor 12, the circuit 200a connects an inductor 51 to the anode of the diode 10 and the negative terminal of the capacitor 12 in place of the inductor 18. However, the operations of the inductors 11 and 51 are identical. The output voltage Vo1 of the output circuit 200a is stabilized in the same manner as the output voltage of the output circuit 200 of FIG. 4.

A second output circuit 300b also differs from the second output circuit 300 of FIG. 4 in that the transformer 15 and diode 16 are absent, and in that the voltage between the positive terminal of the DC voltage source 6 and the anode of the diode 14 are directly applied to opposite ends of the diode 10. While the output circuit 300 connects the inductor 18 to between the cathode of the diode 17 and the positive terminal of the capacitor 19, the output circuit 300b connects an inductor 52 to between the anode of the diode 17 and the negative terminal of the capacitor 19. However, the inductor 52 operates in exactly the same manner as the inductor 18. The output voltage Vo2 of the output circuit 300b is stabilized by the same procedure as with the output circuit 300.

Further, a third output circuit 400b differs from the second output circuit 400 of FIG. 4 in that the transformer 22 and diode 23 are absent, and in that the voltage between the positive terminal of the DC voltage source 6 and the anode of the diode 21 is directly applied to opposite ends of the diode 10 via an inductor 53. It is to be noted that the inductor 53 operates in the same way as the inductor 24 of the output circuit 400. In the third output circuit 400b, an output circuit 420a connects an inductor 54 to between the anode of the diode 27 and the negative terminal of the capacitor 29 in place of the inductor 28 of the corresponding circuit of FIG. 4. The inductor 54 operates in exactly the same manner as the inductor 28. The operation for stabilizing the output voltage Vo3 of the output circuit 400b is the same as the operation described in relation to the output circuit 400 of FIG. 4.

In summary, it will be seen that the present invention provides a multi-output converter which stabilizes the output voltage of a first output circuit by controlling the switching frequency of a switching device, stabilizes the output voltage of a second output circuit by controlling the duty of switching, and controls the resonance frequency of a variable resonance circuit for an output circuit or circuits other than the first and second output circuits. The converter, therefore, maintains the output voltages of the various output circuits stable despite the input voltage which varies over a broad range.

Therefore, even when three or more output circuits are needed, it is not necessary to use a triterminal regulator or a saturable reactor, and it is possible to increase the switching frequency. Further, since the switching loss and the number of parts can be reduced, a miniature, highly reliable and efficient, and inexpensive converter is realized. In addition, since a current having a sinusoidal waveform flows through the switching device, zero current switching can be effected to further reduce the switching loss and to reduce noise.

Various modifications will become possible for those skilled in the art after receiving the teachings of the present disclosure without departing from the scope thereof.

What is claimed is:

1. A multi-output converter comprising:
   a switching circuit connected electrically in series to a DC voltage source for switching conduction of current from the DC voltage source with a duration modulated by frequency modulation and pulse width modulation;
   a fixed resonance circuit connected to a series connection of said DC voltage source and said switching circuit for transforming a first input current flowing for the duration of conduction of said switching circuit into a first current having a sinusoidal waveform;
   a first output circuit for outputting a first output voltage by receiving said first current;
   a frequency modulating circuit responsive to said first output voltage for modulating the duration of conduction of said switching circuit on a frequency basis to thereby stabilize said first output voltage;
   a second output circuit connected to said series connection of said DC voltage source and said switching circuit;
   a pulse width modulating circuit responsive to a second output voltage for modulating the duration of conduction of said switching circuit on a pulse width basis to thereby stabilize said second output voltage;
   a variable resonance circuit connected to said series connection for transforming said first input current flowing for the duration of conduction of said switching circuit into a second current having a sinusoidal waveform, a current duration of said second current being controlled by a control voltage;
   a third output circuit producing a third output voltage by receiving said second current of said variable resonance circuit; and
   a resonance frequency modulating circuit for changing a resonance frequency of said variable resonance circuit to change the current duration of said second current in response to said third output voltage, thereby stabilizing said third output voltage.

2. A multi-output converter as claimed in claim 1, wherein said first output circuit receives a current of positive direction contained in said first circuit, and said third output circuit receives a current of positive direction contained in said second circuit.

3. A multi-output converter as claimed in claim 1, wherein said switching circuit comprises a switching element serially connected to said DC voltage source, a first one-way element serially connected to said switching element in the same conduction direction as said switching element, and a second one-way element connected in parallel to and in opposite direction to a serial connection of said switching element and said first one-way element;

said fixed resonance circuit comprising a serial connection of an inductor and a capacitor connected to opposite ends of said serial connection of said DC voltage source and said switching circuit, said fixed resonance circuit having an output terminal implemented by opposite ends of said capacitor;

said first output circuit comprising a first transformer having a primary winding connected to said output terminal of said fixed resonance circuit, and a first rectifying and smoothing circuit connected to a secondary winding of said first transformer;

said frequency modulating circuit controlling a switching period of said switching circuit by feeding to said switching circuit a modulation frequency signal which reduces a difference of said first output voltage from a predetermined first reference voltage;

said second output circuit comprising a second transformer having a primary winding which is directly connected to one end to one end of said series connection of said DC voltage source and said switching circuit and connected at the other end to the other end of said series connection of said dc voltage source and said switching circuit via a third one-way element, and a second rectifying and smoothing circuit is connected to a secondary winding of said second transformer;

said pulse width modulating circuit controlling the conduction duration of said switching circuit by feeding to said switching circuit a pulse signal which reduces a difference of said second output voltage from a predetermined second reference voltage;

said variable resonance circuit comprising a third transformer directly connected at one end to one end of said series connection of said DC voltage source and said switching circuit and connected at the other end to the other end of said series connection of said dc voltage source and said switching circuit via a fourth one-way element, and a series connection of a fifth one-way element, an inductor and a variable capacitor connected to a secondary winding of said third transformer, said variable capacitor changing a capacitance in response to a control voltage and having opposite ends implemented as an output terminal of said variable resonance circuit;

said third output circuit constituting a third rectifying and smoothing circuit connected to said output terminal of said variable resonance circuit; and said resonance frequency modulating circuit controlling a resonance frequency of said variable resonance circuit by feeding to said variable capacitor said control voltage which reduces a difference of said third output voltage from a predetermined third reference voltage.

4. A multi-output converter as claimed in claim 1, wherein said switching circuit comprises a switching element serially connected to said DC voltage source, a first one-way element serially connected to said switching element in the same conduction direction as said switching element, and a second one-way element connected in parallel to and in opposite direction to a series connection of said switching element and said first one-way element;

said fixed resonance circuit comprising a serial connection of an inductor and a capacitor connected to opposite ends of said series connection of said DC voltage source and said switching circuit, an output terminal of said fixed resonance circuit being constituted by opposite ends of said capacitor;

said first output circuit comprising a first transformer having a primary winding connected to said output terminal of said fixed resonance circuit, and a first rectifying and smoothing circuit connected to a secondary winding of said first transformer;

said frequency modulating circuit controlling a switching period of said switching circuit by feeding to said switching circuit a modulation frequency signal which reduces a difference of said first output voltage from a predetermined first reference voltage;

said second output circuit comprising a second transformer having a primary winding which is directly connected at one end to one end of said series connection of said DC voltage source and said switching circuit and connected at the other end to the other end of said series connection of said dc voltage source and said switching circuit via a third one-way element, and a second rectifying and smoothing circuit connected to a secondary winding of said second transformer;

said pulse width modulating circuit controlling the duration of conduction of said switching circuit by feeding to said switching circuit a pulse signal which reduces a difference of said second output voltage from a predetermined second reference voltage;

said variable resonance circuit comprising a series connection of a fourth one-way element, an inductor and a variable capacitor connected to a secondary winding of said second transformer, said variable capacitor changing capacitance in response to a control voltage and having opposite ends implemented as an output terminal of said variable resonance circuit;

said third output circuit comprising a third rectifying and smoothing circuit connected to said output terminal of said variable resonance circuit; and said resonance frequency modulating circuit controlling a resonance frequency of said variable resonance circuit by feeding to said variable capacitor said control voltage which reduces a difference of said third output voltage from a predetermined third reference voltage.

5. A multi-output converter as claimed in claim 1, wherein said switching circuit comprises a switching element serially connected to said DC voltage source, a first one-way element serially connected to said switching element in the same conduction direction as said switching element, and a second one-way element connected in parallel to and in opposite direction to a series connection of said switching element and said first one-way element;

said fixed resonance circuit comprising a series connection of an inductor and a capacitor connected to opposite terminals of said series connection of said DC voltage source and said switching circuit, an output terminal of said fixed resonance circuit being constituted by opposite ends of said capacitor;

said first output circuit constituting a first smoothing circuit, connected to said output terminal of said fixed resonance circuit;

said frequency modulating circuit controlling a switching frequency of said switching circuit by feeding to said switching circuit a modulation frequency signal which reduces a difference of said first output voltage from a predetermined first reference voltage;

said second output circuit constituting a second smoothing circuit directly connected at one end to one end of said series connection of said DC voltage source and said switching circuit and connected at the other end to the other end of said series connection of said dc voltage source and said switching circuit via a third one-way element;

said pulse width modulating circuit controlling the duration of conduction of said switching circuit by feeding to said switching circuit a pulse signal which reduces a difference of said second output voltage from a predetermined second reference voltage;

said variable resonance circuit comprising a series connection of a fourth one-way element, an inductor and a variable capacitor directly connected at one end to one end of said series connection of said DC voltage source and said switching circuit and connected at the other end to the other end of said series connected via a fourth one-way element, said variable capacitor changing capacitance in response to a control voltage and having opposite ends implemented as an output terminal of said variable resonance circuit; and said resonance frequency modulating circuit controlling a resonance frequency of said variable resonance circuit by feeding to said variable capacitor said control voltage which reduces a difference of said third output voltage from a predetermined third reference voltage.

6. A multi-output converter comprising:

a switching circuit connected to a DC voltage source and having a duration of conduction turned on and off; and a variable resonance citcuit connected to opposite ends of a series connection of said switching circuit and said DC voltage source for transforming an input current flowing for the duration of conduction of said switching circuit into a current having a sinusoidal waveform, a current duration of the positive direction of said current being controlled by a control voltage;

an output circuit for producing an output voltage by receiving said current duration of positive direction;

a resonance frequency modulating circuit for changing a resonance frequency of said variable resonance circuit to change the current duration of the positive direction in response to said output voltage, thereby stabilizing said output voltage.

7. A multi-output converter as claimed in claim 6, wherein said switching circuit comprises a switching element serially connected to said DC voltage source, a first one-way element serially connected to said switching element in the same conduction direction as said switching element, and a second one-way element connected in parallel to and in opposite direction to a series connection of said switching element and said first one-way element;

said variable resonance circuit comprising a transformer having a primary winding directly connected at one end to one end of said series connection of said DC voltage source and said switching circuit and connected at the other end to the other end of said series connection of said dc voltage source and said switching circuit via a third one-way element, and a series connection of a fourth one-way element, an inductor and a variable capacitor connected to a secondary winding of said transformer, said variable capacitor changing capacitance in response to a control voltage and having opposite ends implemented as an output terminal of said variable resonance circuit;

said output circuit constituting a smoothing and rectifying circuit connected-to said output terminal of said variable resonance circuit;

said resonance frequency modulating circuit controlling a resonance frequency of said variable resonance circuit by feeding to said variable capacitor said control voltage which reduces a difference of said output voltage from a predetermined reference voltage.

* * * * *